United States Patent

[11] 3,604,087

| [72] | Inventor | Ralph A. Beck |
| | | Beloit, Wis. |
| [21] | Appl. No. | 19,313 |
| [22] | Filed | Mar. 13, 1970 |
| [45] | Patented | Sept. 14, 1971 |
| [73] | Assignee | Beloit Corporation |
| | | Beloit, Wis. |

[54] ANTIDEFLECTION ROLL
11 Claims, 7 Drawing Figs.

[52] U.S. Cl. .................................................. 29/127
[51] Int. Cl. .................................................. B21b 31/08
[50] Field of Search ........................................ 29/127, 130, 116 AD, 129; 100/162 B

[56] References Cited
UNITED STATES PATENTS

| 727,838 | 5/1903 | Quigley et al. | 29/127 |
| 905,111 | 11/1908 | Stehling et al. | 29/130 X |
| 1,271,194 | 7/1918 | Meyer | 29/130 X |
| 3,094,771 | 6/1963 | Robertson | 29/116 AD |
| 3,168,435 | 2/1965 | Beachler | 100/162 B UX |
| 3,485,615 | 12/1969 | Rahrig et al. | 29/127 X |

FOREIGN PATENTS

| 747,347 | 4/1956 | Great Britain | 100/162 B |
| 1,204,551 | 8/1959 | France | 29/130 |
| 934,646 | 11/1955 | Germany | 29/116 |

*Primary Examiner*—Alfred R. Guest
*Attorney*—Hill, Sherman, Meroni, Gross & Simpson ABSTRACT: A roll for supporting a moving web includes a helical spring covered by a flexible outer shell to provide for curvature of the roll which may be preset to compensate for deflections of the roll. The roll has an inner core or shaft construction which includes an elongate shaft extending through a plurality of spaced-apart annular flanges each of which includes a groove at the same lead angle as the lead angle of the helical spring for threadedly engaging the turns of the spring and aiding in fabrication of the roll. The shaft may be supported in an antideflection mode of operation by securing the end thereof for rotation in spherical bearings and providing means at the distal ends of the shaft for imparting a selected deflection to the shaft. The roll may also be configured as a bowed roll by providing a nonrotational fulcrum for the shaft at each end of the roll and by providing means at each distal end of the roll for imparting bowing forces to the roll. In this configuration, the flanges which connect the shaft to the flexible portion of the roll are provided as bearings with the central portions of flanges forming a bearing race to be secured to the shaft and the outer portions of the flange forming an outer bearing race for threaded engagement with the helical spring. As a bowed roll the apparatus is further provided with means for adjusting the supporting apparatus of the roll for varying the plane of deflection.

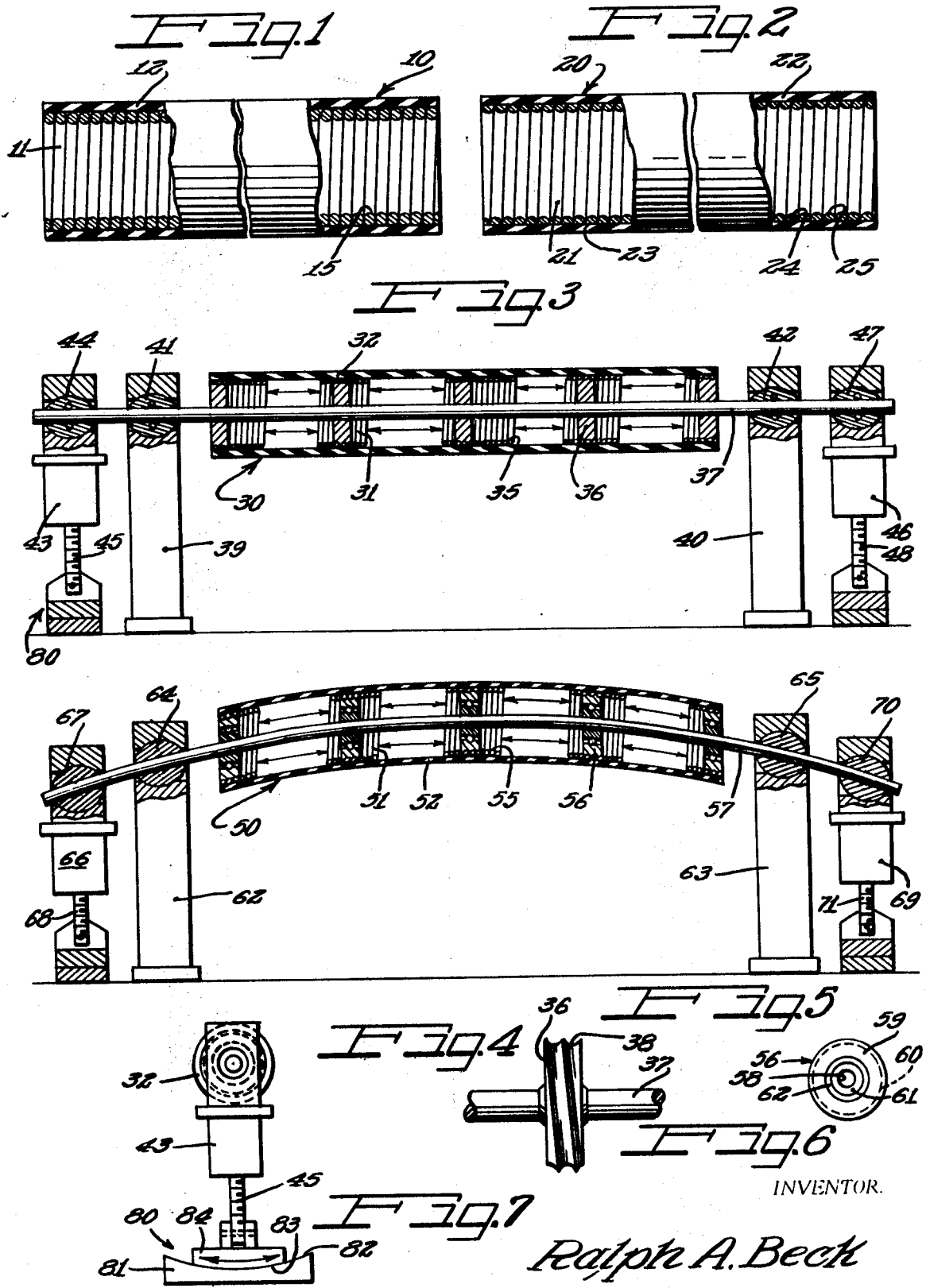

3,604,087

ANTIDEFLECTION ROLL

BACKGROUND OF THE INVENTION

1. Field of the Invention

This invention relates to rolls for supporting a moving web, and more particularly to flexible rolls which may be utilized in an antideflection operating configuration or in a bowed operating configuration.

Description of the Prior Art

The use of longitudinally curved rolls for various forms of correction in rotatably supported moving web apparatus is well recognized in the art. Generally these rolls are constructed with a flexible outer surface supported on a flat helically wound strip member or on a plurality of side-by-side, spaced-apart tubular members which permit flexure of the roll. The supporting apparatus for the flexible outer shell is secured to a plurality of spaced-apart flanges which are in turned secured to a center shaft. The shaft is nonrotatably supported and the flanges each include a bearing for rotatably supporting the flexible outer members for rotation about the shaft. The shaft is adapted to receive a bowing force and the outer flexible members rotate about the bowed axis of the shaft in a longitudinally curved configuration.

SUMMARY OF THE INVENTION

Rolls constructed in accordance with the principles of the present invention include a flexible outer surface carried on a helical spring formed of spring stock of round cross-sectional configuration so that the helical turns of the spring provide a threaded interior of the roll having a certain thread lead angle.

The spring and the flexible outer covering are supported on a center shaft by a plurality of spaced-apart flanges each of which includes a groove thereabout at the same lead angle as that of the helical spring so that during fabrication of a roll the flanges are threaded into the threaded bore defined by the turns of the helical spring.

In one construction, the shaft of the roll is rotatably supported in spherical bearings outboard of the ends of the roll while the distal ends of the shaft are coupled by way of spherical bearings to apparatus for imparting a desired deflection in the roll to compensate for operational deflections under load.

In another construction the flanges each include bearings for rotatably supporting the flexible spring and flexible outer shell on the shaft and the shaft is provided with means for supporting the shaft in a bowed condition.

The proper roll versus load setting may be advantageously adjusted by utilizing adjustable supporting means for the ends of the shaft which may be varied to impart different planes of curvature to the roll.

BRIEF DESCRIPTION OF THE DRAWINGS

Other objects, features and advantages of the invention, its organization, construction and operation will become readily apparent and the invention will be best understood from the following detailed description taken in conjunction with the accompanying drawings, in which:

FIG. 1 is an elevational view showing a portion of a roll construction with a part of the apparatus broken away to view the interior thereof;

FIG. 2 is an elevational view of another roll construction, also partially broken away to illustrate the interior thereof;

FIG. 3 is an elevational view, with portions broken away, of a roll supported for antideflection rotational operation;

FIG. 4 is an elevational view of a flange which may be employed in the rolls illustrated in FIGS. 1, 2 and 3;

FIG. 5 is an elevational view, with portions broken away, illustrating a roll supportingly configured for bowed operation, FIG. 6 is an elevational view of a flange for use in the roll illustrated in FIG. 5; and FIG. 7 is an end view of a roll and its supporting apparatus, specifically illustrating means for adjusting the plane of curvature of the roll.

DESCRIPTION OF THE PREFERRED EMBODIMENTS

In FIG. 1 the outer flexible portions of a roll are generally illustrated at 10 as comprising a tightly wound coil or helical spring 11 over which a tube 12 of flexible material is disposed. The spring 11 is formed from a stock having a circular cross section so that the interior surface of the hollow construction includes a thread 15 having lead angle defined by the helix of the spring 11.

FIG. 2 illustrates an alternative hollow construction 20 comprising a tightly wound helical coil spring 21 which supports a flexible outer shell 22. The coil spring is slipped over a mandrel and machined to provide a flat outer surface 23 from the original circular cross section of the spring 21. The outer surface of the spring 21 is therefore smoothed for continuous engagement with an innersurface 24 of the shell 22. As in FIG. 1, the hollow interior of the construction includes a thread 25 having a lead angle defined by the helix of the spring 21.

FIGS. 3 and 4 illustrate a roll which may be constructed by utilizing the apparatus of FIGS. 1 and 2. In FIG. 3 there is shown a hollow flexible construction 30 including a helical spring 31 having a flexible shell 32 disposed thereabout. The interior of the construction 30 includes a thread 35 having a lead angle defined by the helix of the spring 31. A plurality of fins or flanges 36 threadedly engage the threads 35 of the hollow construction 30 to aid in assembly. FIG. 4 illustrates a fin or flange 36 as being supported on a shaft 37 and including a helical groove 38 having the same lead angle as the thread 35 of the spring 31.

In assembly of the roll, the shaft 37 has the fins or flanges 36 secured thereto and the flange and shaft assembly is threaded through the interior of the hollow construction 30. The end flanges may then be welded to the spring 31.

The shaft 37 is rotatably supported by a pair of stands 39 and 40, which may form a part of a frame of a papermaking machine. The stands 39 and 40 respectively include spherical bearings 41 and 42 for rotatably supporting the shaft. At the opposite ends of the shaft means are provided for introducing a deflection in the shaft and include jack units 43 and 46, either hydraulic or screw type, having respective extensible members 45 and 48 for adjusting the jack units relative a support 80. Each of the jack units includes a respective spherical bearing 44 and 47 for rotatably supporting the ends of the shaft as the shaft is deflected, the spherical bearings 41 and 42 acting as fulcrum points for the deflection.

Rolls constructed in accordance with the foregoing techniques may be advantageously employed in an antideflection table as table rolls, or as felt rolls and the deflection underload may be removed, or a slight camber or crown may be adjusted into the roll.

It would also be advantageous to adjust the angle of deflection for the proper roll versus load setting. Means for accomplishing such adjustment are illustrated in FIG. 7 wherein the member 45 of the jack unit 43, for example, is supported on a member 84 having a convex arcuate shaped surface 83 for adjustment along a concave arcuate shaped surface 82 of a base member 81.

FIGS. 5 and 6 illustrate the construction of a bowed roll constructed in accordance with the present invention in which a flexible hollow outer construction 50 is provided similar to the previous hollow constructions 10, 20 and 30. The roll includes a nonrotating center shaft 57 which is pivotally secured at its ends by spherical pivots 64 and 65 which are supported in stands 62 and 63 respectively. The shaft 57 may be bowed by jack units 66, 69 which are secured to opposite ends of the shaft by spherical pivots 67 and 70. Each of the jacks includes a respective extensible adjustment member 68 and 71.

The hollow outer construction 50 includes a helical thread 55 defined by the helical turns of the spring 51.

The shaft 57 is coupled to the hollow construction 50 by means of a plurality of flanges 56. FIG. 6 illustrates a flange 56 as comprising a helical groove 60 about its periphery having a lead angle equal to the lead angle of the helix of the spring 51. The flange 56 further includes an outer portion 59, a central portion 61 and an intermediate portion 62. The intermediate portion 62 is a bearing and the inner and outer portions 61 and 59 serve respectively as inner and outer bearing races. The inner portions 61 includes a bore 58 for receiving the shaft 57 therethrough.

During fabrication, the flanges would be advanced to their proper positions within the hollow construction 50 by threading and secured, if desired, by welding or the like. The shaft 57 would then be pressed through each bore 58 of the respective flanges. If desired at this point, the shaft and the outer flanges could additionally be secured by any suitable means, such as welding. The shaft 57 carrying the roll is then mounted on the supports 62, 63 and locked into its proper position by means of the jack units 66 and 69. The angle of the plane defined by the bow of the roll may also be adjusted if required by the apparatus 80 illustrated in FIG. 7.

Many changes and modifications in the invention will become apparent to those skilled in the art without departing from the spirit and scope of the invention, and it is to be understood that I wish to include within the patent warranted hereon all such changes and modifications as may reasonably and properly be included within the scope of the appended claims.

WHAT I CLAIM IS:

1. A roll structure for supporting a moving web, comprising: a tightly wound helical spring; a flexible tubular shell having an inner surface embracing said spring and an outer surface for supporting a moving web; a plurality of annular flanges spaced apart within said spring, each having a central bore and a peripheral groove at the same lead angle as the helix of the spring, the grooves of said flanges threadedly engaging the turns of said spring; a shaft extending through the bores of and secured to said flanges; means for deflecting said shaft, said spring and said shell about the axis of said shaft; and means including said flanges for supporting said spring and said shell for rotation about the deflected axis of said shaft.

2. A roll structure according to claim 1, wherein said helical spring includes a shaped cross section of each turn to provide a smooth surface for contacting said inner surface of said tubular shell.

3. A roll structure according to claim 1, wherein each of said flanges includes a central portion having said bore and secured to said shaft, an outer portion having said groove, and a bearing secured between said central and outer portions whereby said spring and shell are rotatably carried on said shaft.

4. A roll structure according to claim 3, including means for nonrotatably supporting said shaft.

5. A roll structure according to claim 1, wherein said means for supporting said spring and shell for rotation includes a pair of spaced-apart stands each including a spherical bearing carrying said shaft.

6. A roll structure according to claim 1, wherein said means for deflecting said shaft includes a pair of stands for supporting said shaft inboard of its respective ends and a pair of adjustable means at respective ends of said shaft for imparting a force at an angle to the axis of the shaft, whereby said stands serve as fulcrums.

7. A roll structure according to claim 1, wherein said means for supporting said spring and shell for rotation comprises a pair of spaced-apart supports each including a first bearing for rotatably supporting said shaft outboard of the ends of said shell, and said deflecting means comprises a pair of adjustable means each including a second bearing rotatably supporting a respective end of said shaft outboard of said supports.

8. A roll structure according to claim 7, wherein each of said adjustable means includes a jack having a screw member secured to a supporting surface.

9. A roll structure according to claim 7, wherein each of said adjustable means includes a fluid operated jack having an extensible member secured to a supporting surface.

10. A roll structure according to claim 7, wherein each of said adjustable means includes a base to be secured to a supporting surface, a first arcuate surface on said base, a leg carrying said second bearing, and a member secured to said leg having a second arcuate surface for sliding engagement with said first arcuate surface.

11. A roll structure according to claim 10, wherein one of said arcuate surfaces is convex and the other is concave and of a corresponding arcuate shape.